US007676376B2

(12) United States Patent
Colman (10) Patent No.: US 7,676,376 B2
(45) Date of Patent: Mar. 9, 2010

(54) RATE AND DISTRIBUTION SYSTEM

(75) Inventor: Renee Colman, Phoenix, AZ (US)

(73) Assignee: U-Haul International, Inc., Phoenix, AZ (US)

( * ) Notice: Subject to any disclaimer, the term of this patent is extended or adjusted under 35 U.S.C. 154(b) by 1482 days.

(21) Appl. No.: 10/386,413

(22) Filed: Mar. 10, 2003

(65) Prior Publication Data

US 2004/0181437 A1    Sep. 16, 2004

(51) Int. Cl.
*G06Q 10/00* (2006.01)
(52) U.S. Cl. .......................................................... 705/1
(58) Field of Classification Search ...................... 705/1
See application file for complete search history.

(56) References Cited

U.S. PATENT DOCUMENTS

| 3,808,410 | A | 4/1974 | Schlesinger ................ 235/156 |
| 4,700,295 | A | 10/1987 | Katsof et al. ................ 364/401 |
| 4,787,036 | A | 11/1988 | Fleming ..................... 364/401 |
| 4,788,643 | A | 11/1988 | Trippe et al. ................ 364/407 |
| 4,988,125 | A * | 1/1991 | Calhoun ....................... 283/67 |
| 5,191,523 | A | 3/1993 | Whitesage .................. 364/407 |
| 5,270,921 | A | 12/1993 | Hornick ..................... 364/407 |
| 5,644,721 | A | 7/1997 | Chung et al. ................ 395/206 |
| 5,652,867 | A | 7/1997 | Barlow et al. .............. 395/500 |
| 5,726,885 | A | 3/1998 | Klein et al. .......... 364/423.098 |
| 5,832,452 | A | 11/1998 | Schneider et al. .............. 705/5 |
| 5,873,069 | A | 2/1999 | Reuhl et al. .................. 705/20 |
| 5,909,668 | A | 6/1999 | Fukuma ......................... 705/5 |
| 5,918,209 | A | 6/1999 | Campbell et al. .............. 705/5 |
| 5,946,660 | A | 8/1999 | McCarty et al. ................ 705/5 |
| 5,948,040 | A * | 9/1999 | DeLorme et al. ............. 701/201 |
| 5,953,706 | A | 9/1999 | Patel ............................. 705/6 |
| 5,966,695 | A | 10/1999 | Melchione et al. ............ 705/10 |
| 5,974,403 | A | 10/1999 | Takriti et al. ................. 705/412 |
| 6,006,196 | A | 12/1999 | Feigin et al. .................. 705/10 |
| 6,044,351 | A | 3/2000 | Jones ............................ 705/2 |
| 6,044,355 | A | 3/2000 | Crockett et al. ................ 705/8 |
| 6,044,357 | A | 3/2000 | Garg ........................... 705/10 |
| 6,058,369 | A | 5/2000 | Rothstein ..................... 705/10 |
| 6,058,370 | A | 5/2000 | Church et al. ................. 705/10 |
| 6,061,691 | A | 5/2000 | Fox ............................ 707/104 |
| 6,078,889 | A | 6/2000 | Boucher et al. ................ 705/1 |
| 2002/0188581 | A1 * | 12/2002 | Fortin et al. ................... 706/20 |
| 2003/0078897 | A1 * | 4/2003 | Florance et al. .............. 705/80 |
| 2003/0177045 | A1 * | 9/2003 | Fitzgerald et al. .............. 705/6 |

OTHER PUBLICATIONS www.uhaul.com on archive.org for Feb. 2002.*

* cited by examiner

*Primary Examiner*—John G Weiss
*Assistant Examiner*—Vern Cumarasegaran
(74) *Attorney, Agent, or Firm*—Tiffany & Bosco, P.A.

(57) ABSTRACT

The rate and distribution system of the present invention enables an user to more accurately and quickly generate specific rental rates employing a browser-based system. In a preferred embodiment of the invention, the rate and distribution system includes an interactive graphical mapping interface depicting the geographic location of the entities of an equipment rental business. The mapping interface preferably comprises a touchscreen and is configured to allow an user to define a region by selecting it on the map. Upon defining a region, the system enables the user to set a rental rate for the defined region. In a more preferred embodiment of the invention, the system enables the user to identify the equipment category to which the rate applies and select a future effective date for the rate.

26 Claims, 11 Drawing Sheets

CATEGORIES

100

| CATEGORY NAME | DESCRIPTION | ALLOW RATE SETTING | ACTIVE | UPDATED DATE | UPDATED BY | EDIT | DELETE |
|---|---|---|---|---|---|---|---|
| | 104 | | | | | | |
| CAT 1 | CATEGORY 1 | — | YES | 2002-02-18 12:53:20.0 | RENEE | EDIT | ☐ |
| CAT 2 | CATEGORY 2 | YES | YES | 2002-02-18 12:54:34.0 | RENEE | EDIT | ☐ |
| CAT 3 | CATEGORY 3 | YES | YES | 2002-02-18 12:54:40.0 | RENEE | EDIT | ☐ |
| CAT 4 | CATEGORY 4 | — | YES | 2002-02-18 12:52:53.0 | RENEE | EDIT | ☐ |

102

ADD NEW CATEGORY | DELETE CHECKED

ADD CITY — 130 — SAVE | CANCEL

| | ATTRIBUTES | VALUE |
|---|---|---|
| 132 | | |
| 134 — | CITY NAME | [ ] |
| | COUNTY | [ ] |
| 136 — | STATE, COUNTRY | [ ▽ ] |
| | DESTINATION CODE | [ ] |
| | | (NONE) |
| | RATE CITY REFERENCE | SYSTEM RESOLVE | SELECT FROM MAP |
| | | SELECT FROM SEARCH |
| | REFERENCING CITIES | [ ] |
| | | REMOVE SELECTED | INSERT FROM MAP |
| | | INSERT FROM SEARCH |
| | INTERNATIONAL CITY | ☐ |
| | KEY CITY | ☐ |
| | MAJOR METRO | ☐ |
| | MIN ONEWAY MILES | [ ] MILES |
| | MCOs (AND DROP OFF PHONE) ASSOCIATED TO THIS CITY | MCO DROP OFF PHONE NUMBERS |

CITY GROUPS

| | SELECTED | | REMAINING |
|---|---|---|---|
| 138 — CITY GROUPS | [ ] | ADD SELECTED | LONG ISLAND NY |

COMPETITORS/DATE ADDED

| | SELECTED | | REMAINING |
|---|---|---|---|
| 140 — COMPETITORS | [ ] | ADD SELECTED | COMPANY 1<br>COMPANY 2<br>COMPANY 3 |

LOCATION  STATIC ☐ HELP  MAP IT
142 ─┘

FIG. 9

COMPETITORS                          ADD NEW COMPETITOR

144

| NAME | EDIT |
|------|------|
| COMPANY 1 | EDIT |
| COMPANY 2 | EDIT |

RATE AND DISTRIBUTION SYSTEM

FIELD OF INVENTION

The present invention is generally a system for setting rates and more particularly, a rate setting system having a geospatial graphical interface to facilitate the rate setting function.

BACKGROUND OF THE INVENTION

In the business of renting, cars, trucks, moving equipment, or other types of products, it is necessary to vary the rental rates depending on a variety of factors, such as the geographical location of the rental facility, seasonal fluctuations, inventory levels and other factors that are well known in the rental industry. In this regard, a central business concern for companies with multiple rental faciliies (collectively referred to herein as "entities") will typically set the rental rates for its various entities based on the entities' geographical location, rental trends, seasonal specials and other factors. Typically, to accomplish the rate setting function, a user studies the various factors and sets the rental rates.

Under known systems, rates are set by selecting reference cities and setting a rate for each of the reference cities. However, if the business concern is large and there are hundreds of cities in which there are rental facilities, then it may not be practical to set individual rates for each city in which the rental business operates. Accordingly, as a practical matter, the rate selected for a reference city will also be the applicable rate for all cities in the area surrounding the reference city, e.g., within a pre-defined radius of the reference city. By grouping the cities together, the user's job will be more manageable.

The disadvantage of this known system is that because the reference city and surrounding cities are grouped together, the rate for the reference city and the surrounding cities must always be the same. The user may choose the city which he or she designates the reference city, however, once the reference city selection is made, the cities within the surrounding area will have the same rate.

It is, therefore, desirable to provide a system which allows the user greater freedom when selecting the specific area for which rates will be set and provide numerous options and tools to accomplish the rate setting task.

The rates set for rental products, or for any other service, is dynamic and must reflect the demands of the market at any given time. Accordingly, it is desirable to provide tools for the user that would provide them with market information and assist them in setting rates, even for a single city without affecting the rate of other cities within a pre-defined area, in a quick, efficient manner. Furthermore, it is desirable to provide a system which immediately broadcasts the set rate to the entities.

SUMMARY OF THE PREFERRED EMBODIMENTS

The rate and distribution system of the present invention enables an authorized user to more accurately and quickly generate specific rental rates employing a browser-based system. In a preferred embodiment of the invention, the rate and distribution system includes an interactive graphical mapping interface depicting the geographic range of business. The mapping interface preferably comprises a computer with touchscreen capabilities giving the user a visual perspective of a geographical area. Upon defining a region, the system enables the user to set a rental rate for the region. In a more preferred embodiment of the invention, the system enables the user to identify the product or category of products to which the rate applies and select the date on which the rate should be effective.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
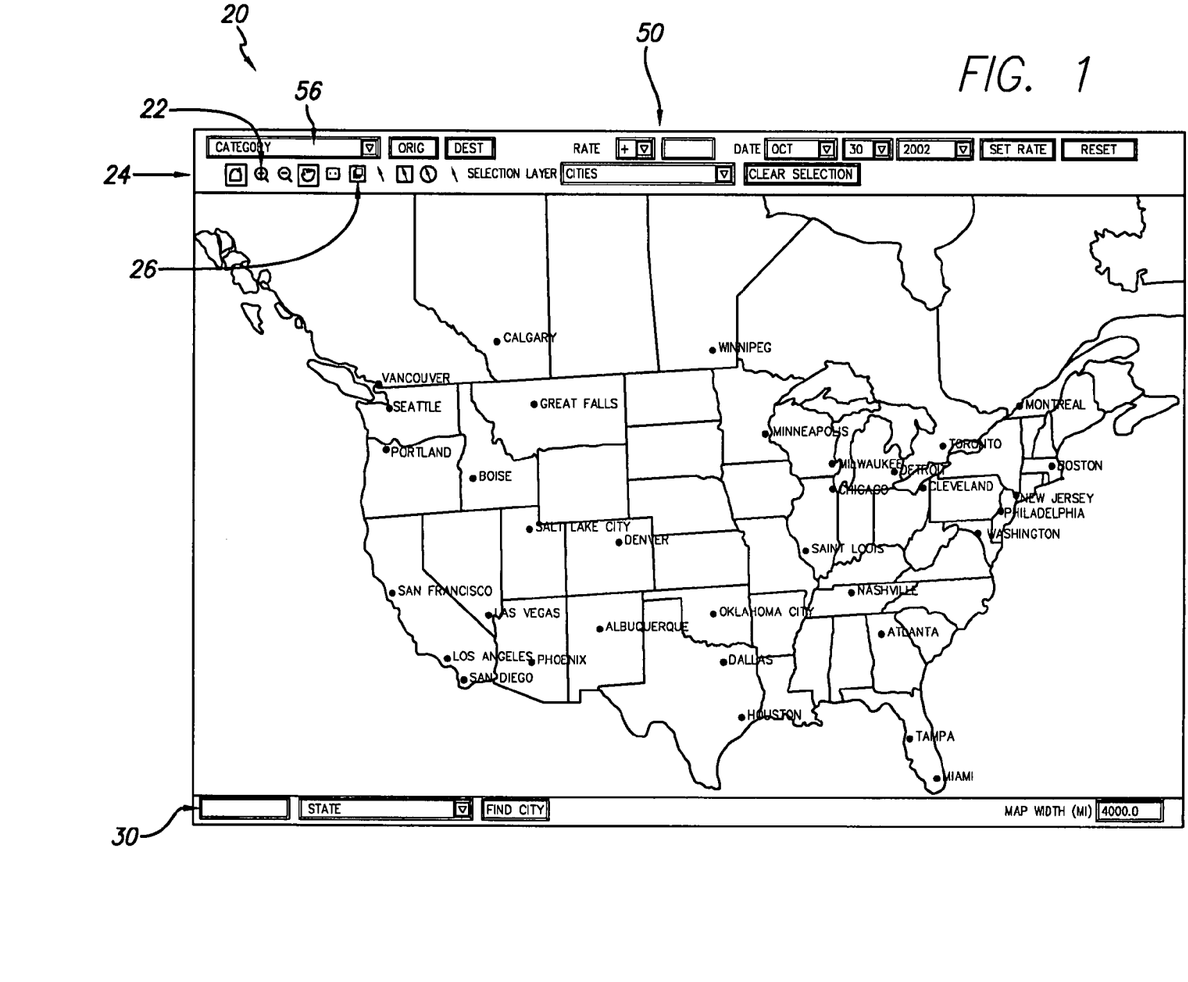
FIG. 1 depicts a preferred embodiment of the graphical interface system of the present invention.

As shown in FIG. 1, in a preferred embodiment of the rate and distribution system 10 of the present invention, a graphical interface system 20 is provided to assist the user in setting rates for rental of products and equipment. The invention is discussed herein in reference to setting rental rates. However, it is envisioned that the rate and distribution system of the present invention can be used in conjunction with other types of businesses, and should not be limited to the rental business.

The graphical interface system 20 is preferably a geographical representation of the area in which the business operates. Specifically, the graphical interface system displays a map. The map could be of the United States, another country, a combination of countries, or any other geographical location, depending on the area of interest. FIG. 1 depicts a map of the continental United States and parts of Canada. This map is for exemplary purposes only and the graphical interface system 20 can be adapted to show any geographical area in which a business operates, however large or small. Accordingly, the map could depict the entire world or any portion thereof. For ease of understanding, the present invention is described in connection with a business that operates in the continental United States and Canada, as shown in FIG. 1.

Figure 2:
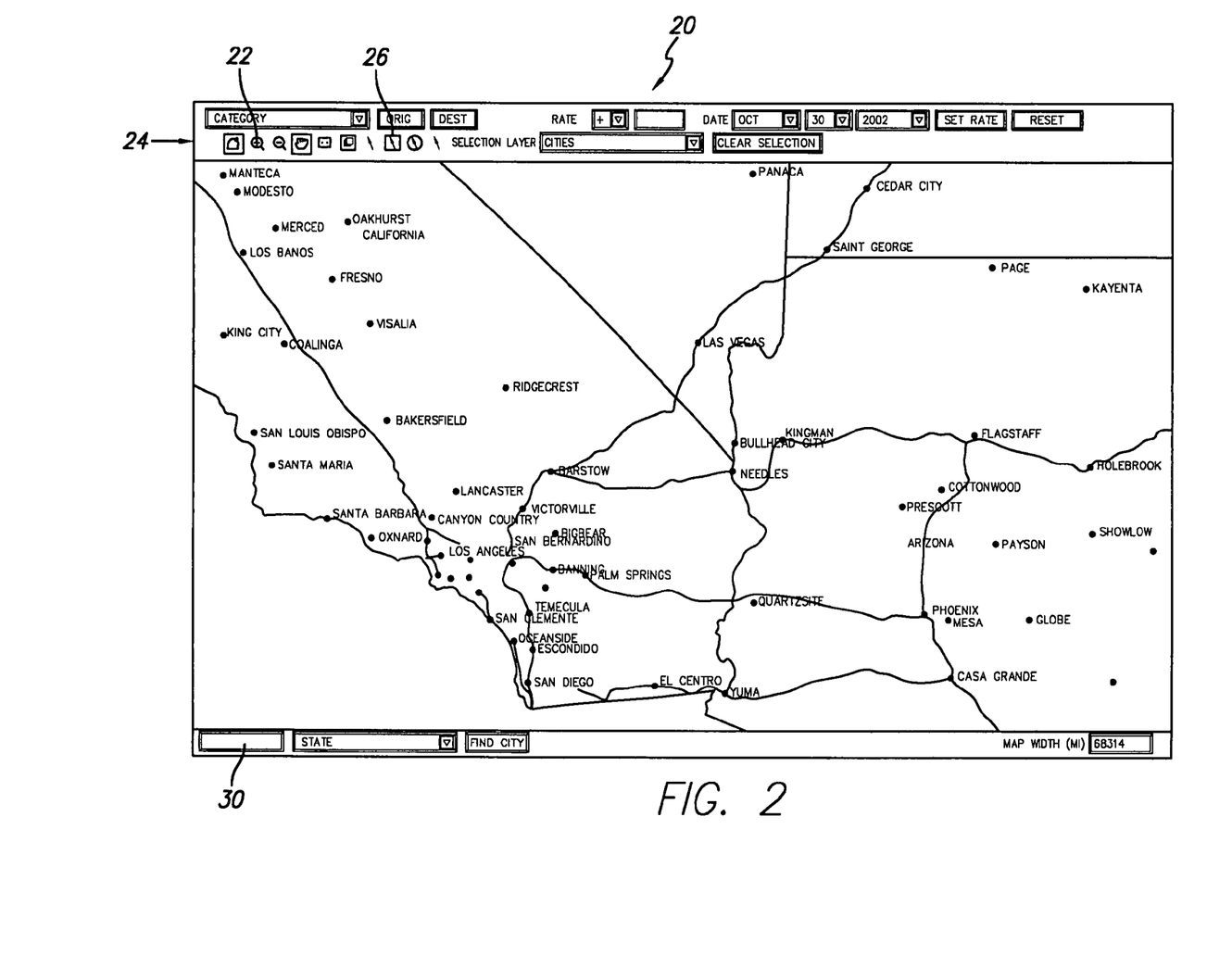
FIG. 2 depicts a preferred embodiment of the graphical interface system of the present invention zoomed into a selected region.
Figure 3:
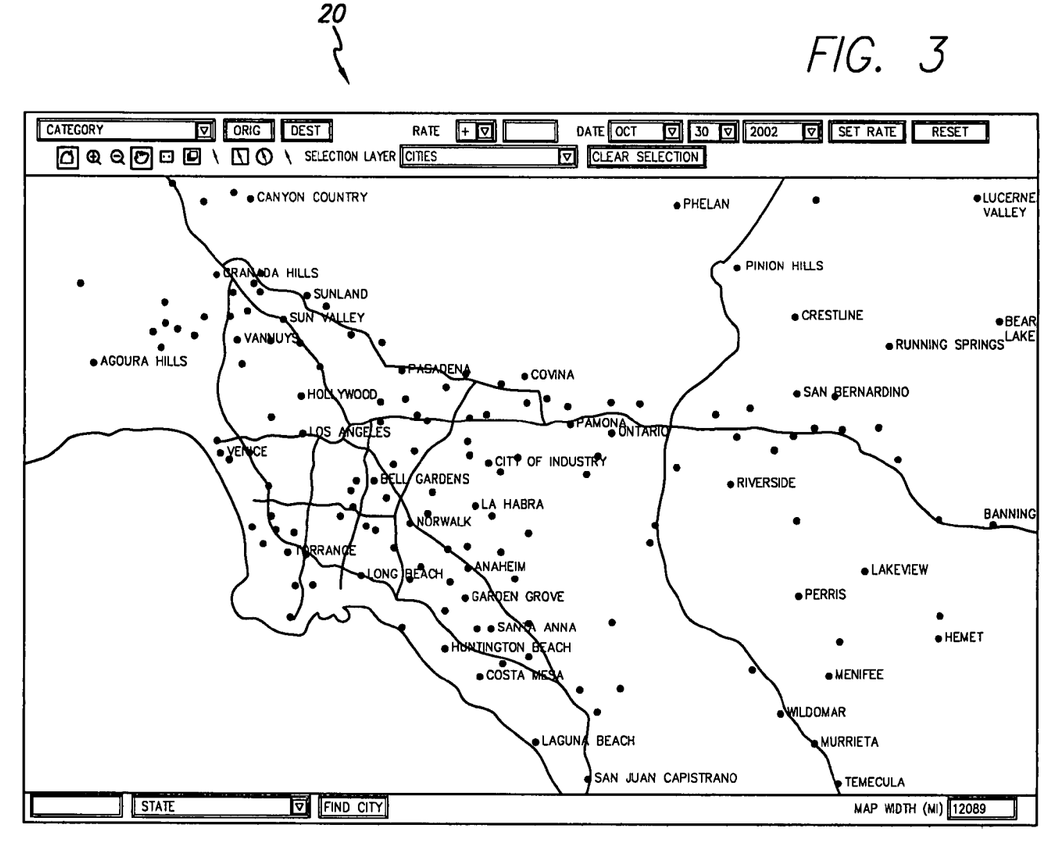
FIG. 3 depicts a preferred embodiment of the graphical interface system of the present invention zoomed into a more detailed level.

The geographical scope of business operations, as shown in FIG. 1, can preferably be viewed at different degrees of detail. For example, FIG. 1, shows the major cities out of which the business operates. If desired, the user can zoom into a particular area, as shown in FIG. 2, to view the major cities of business operation in that area. The graphical interface system 20 is preferably adaptable to focus further on each city. For example, as shown in FIG. 3, the user can zoom into a particular city to view the various neighborhoods of the city in which the business entities exist. FIG. 3 depicts the neighborhoods in and surrounding the Los Angeles area. If desired, the user could further zoom in to see the exact street location of the various entities. The zooming function can be accomplished by methods commonly known, e.g., using the zoom feature 22 on the toolbar 24 or by using an assigned key on the keyboard to zoom in and out. Moreover, the toolbar 24 preferably includes a layer selection feature 26 wherein the user can indicate the degree of detail at which a variety of map features should be displayed. Upon selecting a detail layer, the geographic interface system 20 automatically displays a map with the level of detail requested by the user.

The rate and distribution system of the present invention allows the user to define the specific area for which rates will be set. The area can be a city, a state, or any other geographical region. The user has the flexibility of choosing the exact cities that can be grouped together for the purpose of defining a region for which to set rates or view marketing data. If desired, the user can set a rate for each city individually or a series of contiguous or non-contiguous cities. Changes made to a city or defined region will not affect the rate in nearby cities.

A preferred embodiment of the region defining feature of the present invention will now be described. The user preferably utilizes the graphical interface system 20 of the present invention to select the area for which to define a region. The selection of the area can be performed in a number of ways. In a preferred embodiment of the invention, as shown in FIG. 1, the graphical interface system 20 includes a city identifier feature 30. To locate the city of interest, the user can type in the city name in the city identifier feature 30. Upon identifying a city, the graphical interface system 20 will automatically zoom to a radius of 600 miles (or other predefined area) centering on the requested city. Alternatively, if the user knows the geographical location of the city, the users can choose the zoom tool from the toolbar and touch the map in the general area of the city, zooming to a more detailed view with each touch to the map.

The graphical interface system 20 is preferably a touch-based mapping tool wherein the user manipulates the view by simply touching the area of interest on the map with a stylus or a finger, hereinafter referred to collectively as a selection tool. To define a region, the user can zoom into the area of interest with a selection tool or type in the name of a city. For example, the user can zoom into the west coast area of California, in the general area of Los Angeles (shown in FIG. 4). The system preferably emphasizes the cities in that area that have a rental location. In a preferred embodiment of the invention, the system preferably also designates the cities within the area that do not have rental locations.

Figure 4:
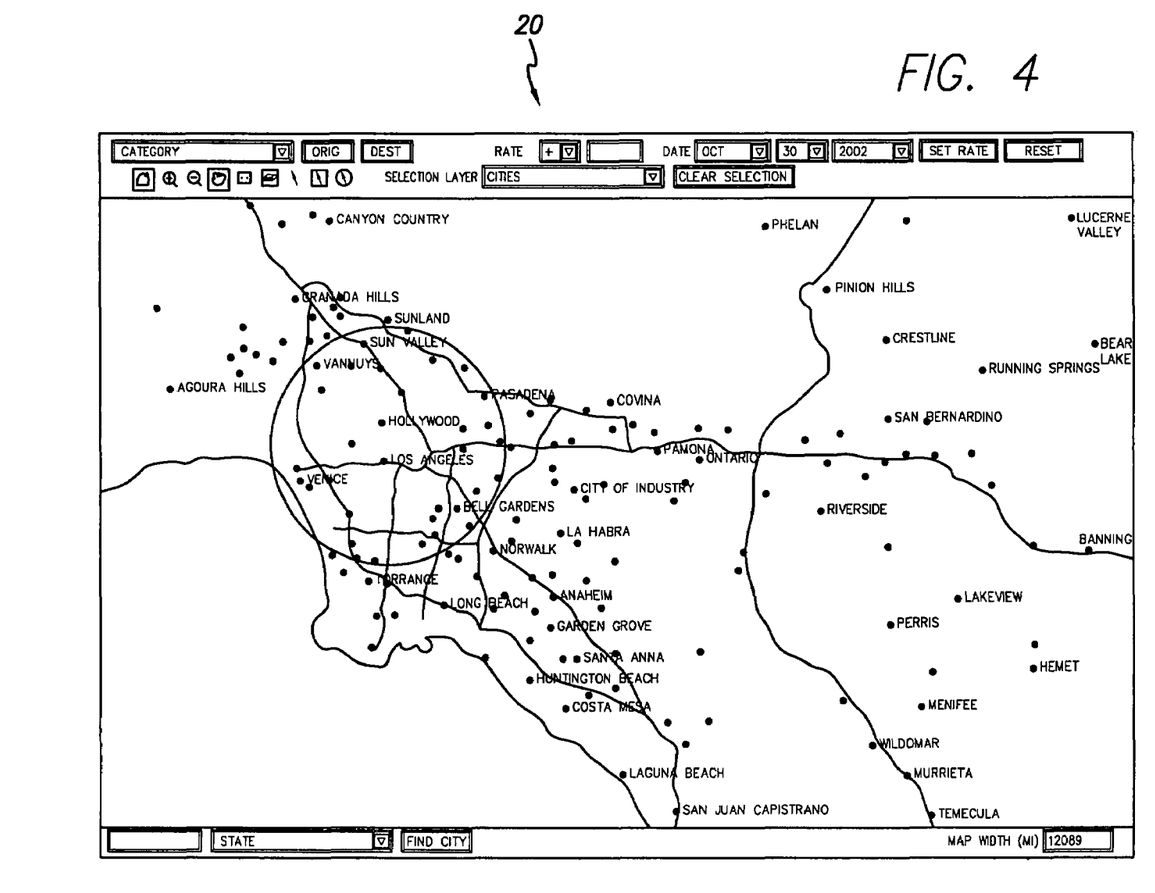
FIG. 4 depicts a preferred embodiment of the graphical interface system of the present invention wherein cities have been selected by the user to define a region.

Upon arriving at the area of interest, the user can define a region. In a preferred embodiment of the invention, there are numerous methods of defining a region. One method of defining a region is to select a city and select a radius, as shown in FIG. 4, surrounding the selected city. Using the graphical mapping tool, the user can simply touch the screen to indicate the radius of coverage. The system will preferably automatically calculate the length of the radius and therefore the distance of the selected region. The defined region does not necessarily have to be selected in the form of a circle. For example, a rectangular or a square region can be defined. The user can free form an area for selection by using pointer arrows of a computer, a stylus, touchscreen, a designated tool from the toolbar specifically designed for this purpose or other selection tools. In this way, the user can define the precise area that will make up a region. In a preferred embodiment of the invention, upon selection of a region, the geographical area will be highlighted to alert the user of the cities that are included in the selected region.

In some situations, the user may wish to exclude some of the cities from the selected region. For example, the user may wish to select a region within a 50 mile radius of Los Angeles, and then, exclude a few cities, such as Beverly Hills and Hollywood, from that region. Using the known rate setting systems, the user would not be able to exclude a city that was within a pre-selected radius of a reference city. However, the present invention enables the user to fine-tune the region, regardless of any cities' proximity to any other city.

Those skilled in the art will recognize that the graphical interface system 20 of the present invention and the selection features described herein can be utilized to define regions of varying sizes, scopes and shapes. For example, the user can select two entirely separate areas, such as the Seattle and Houston areas, and define them as one region or select them for the purpose of setting rates.

Description of the Rate Setting Feature

Figure 5:
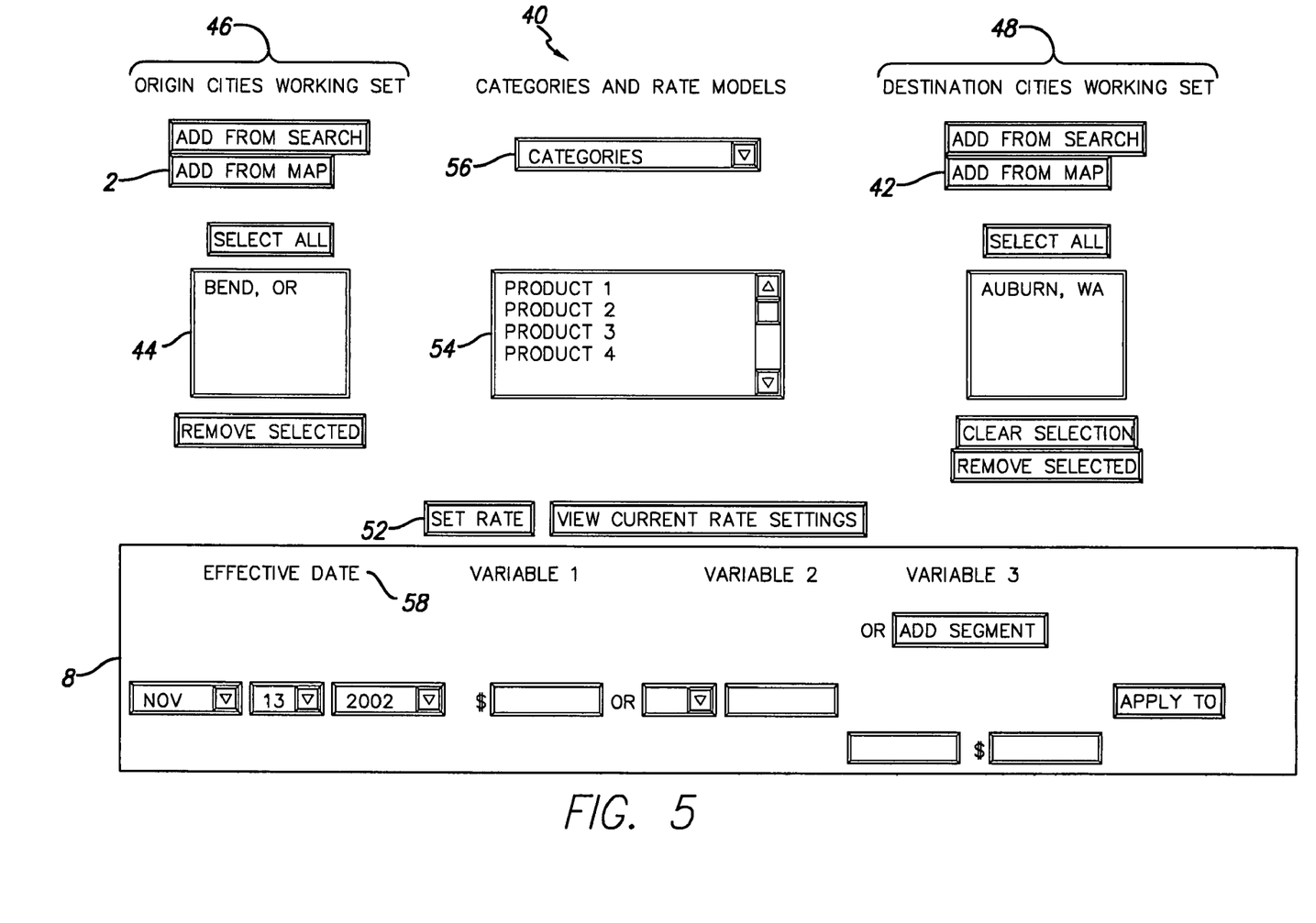
FIG. 5 depicts a detailed working set feature of a preferred embodiment of the present invention.

As best shown in FIG. 5, in a preferred embodiment of the invention, the rate and distribution system 10 includes a detailed working set feature 40. The detailed working set feature 40 preferably includes an Add From Map key 42. Upon activation of the Add From Map key 42, cities and/or regions previously selected on the map, in FIG. 4, will be imported into the detailed working set feature 40 and listed in the cities selection inbox 44. Thereafter, the user can further tailor the list by highlighting the desired cities from the inbox 44. For example, in the situation previously described, if a user wanted to exclude the cities of Beverly Hills and Hollywood from the selection list, the user would highlight all of the cities in the cities selection inbox 44 except for Beverly Hills and Hollywood. As a result, the user is able to further group the cities of interest by defining a region that includes all cities within a given radius of Los Angeles, excluding Beverly Hills and Hollywood. In this regard, the rate setting system of the present invention allows the user to set the same rates for two different cities, regardless of the cities' physical location with respect to each other.

In addition to having a geographic variable that offers the user greater freedom in defining a region by providing a visual mapping reference, the rate and distribution system of the present invention preferably also provides a variable for spatial orientation. That is, cities or regions selected on the map can be designated as origins and/or destinations of the rate setting function. If the areas are designated as origins, then the rate will be set for all rentals originating from the selected areas. Conversely, if the areas are designated as destinations, then the rate will be set for all rentals going to those areas. Furthermore, rates could be set to cover particular routes by selecting origin cities and destination cities.

For example, as shown in FIG. 5, the areas imported from the map have been imported into the origin cities working set 46. Using the same selection techniques described above, the user can select an area for importation into the destination cities working set 48. The rate setting feature of the present invention allows the user to set rates for (1) an area of origin; (2) a destination area; or (3) a particular route from a specified area to a specified area.

In a preferred embodiment of the invention, the system can save the user's selections in memory and enable the user to recall the selections for future use. This feature is especially useful if a user has a selected region or a selected route that is used time after time. In a more preferred embodiment of the invention, the system enables the user to edit the saved regions or routes, as desired.

Upon selection of an area, the system enables the user to set a rate for the selected area. In a preferred embodiment of the invention, the system provides prompts and function keys to assist with the rate setting function. For example, as shown in FIG. 1, a rate setting box 50 is provided for entry of the rate variables. Similarly, as shown in FIG. 5, the detailed working set feature 40 includes a rate setting key 52 to enable the user to set the rate for the selected area. To complete the rate setting step, the user must identify the type of equipment for which the rate is being set. In a preferred embodiment of the invention, as shown in FIG. 1, a category box 56 is provided for enabling the user to select the equipment category directly from the graphical interface or a product box 54 to select individual products.

In a preferred embodiment of the invention, the rate and distribution system includes an effective date feature 58 that enables the users to set rates for a future effective date. For example, industry trends may indicate that certain seasons are busier than others and therefore require multiple rate changes. A user can therefore set a rate at the present time that will be effective for future sales or rentals.

Using the effective date feature of the present invention, the user can set future rates and change the rates as often as desired to accommodate the demands of the market. For example, the user can set a specified rate for July and select a different rate for August. Under prior known rate setting systems, rates are published periodically and are effective from the date of distribution of the new rates until a pre-defined expiration date. The rate and distribution system of the present invention enables the user to set a more accurate rate for an effective future date. Furthermore, using the rate and distribution system of the present invention, the user can ensure that even reservations made months in advance are reserved with the rate that accurately reflects the appropriate rate for the rental season.

If a user neglects to set a rate for a particular area, the system preferably has a default rate that will be used. In a preferred embodiment of the invention, the system provides a warning to the user that a rate has not been set for a particular area and the default rate has been applied. The default rate is preferably applied to all new areas. Under the known prior systems, there would be a delay of 30 days for new areas to have rates. The present invention enables new cities and new areas to have rates immediately.

In another preferred embodiment of the invention, the rate setting feature of the present invention is completely automated eliminating the need for user intervention. By utilizing a series of business rules, the rate and distribution system considers a number of rate setting factors, including the area, current rate, rate history, and other factors known to those in the industry and computes applicable rates for all areas. The automated rate setting feature can be utilized alone or can serve as an initial rate setting function which can thereafter be adjusted by a user.

User Research Information

Figure 12:
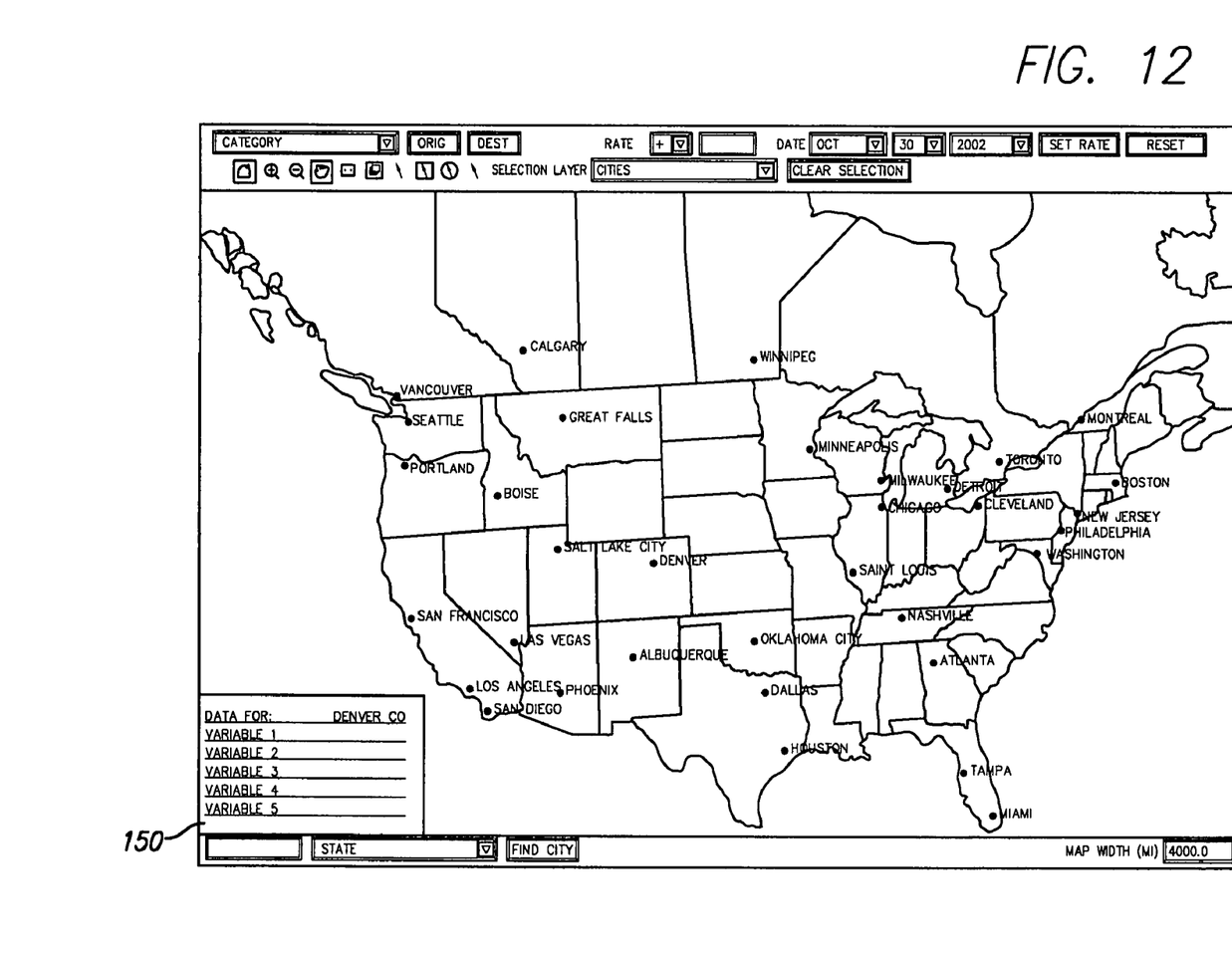
FIG. 12 depicts a preferred embodiment of the pop up information window of the present invention.

In a preferred embodiment of the invention, the rate and distribution system includes a searchable data server that provides users with information pertaining to the business requirements that would be helpful to the user in setting rates. The information would preferably be provided using a series of browser-based graphical interfaces. In a preferred embodiment of the invention, upon selection of an area, a pop up window 150, shown in FIG. 12, will be activated containing pertinent information regarding the selected region.

To provide this information to the user, the rate and distribution system of the present invention is preferably in data communication with a data warehouse. The data warehouse preferably provides information to the rate and distribution system. For example, the data warehouse would advise the user of pre-defined variables that would assist the user in setting rates.

In a preferred embodiment of the invention, the system also stores information pertaining to upcoming or historical events that may affect the or influence the variables used to set rates. For example, on certain holidays there may be an increase in certain rentals or sales. The system preferably stores historic data regarding such events and holidays and advises the user as the date approaches.

Security Features

The rate and distribution system of the present invention preferably includes a security feature which only allows an authorized user to set rates for the area which the user is responsible. This safety feature prevents a user from setting rates for another user's area unless responsibility for that region has been delegated.

In the event that a user inadvertently selects an area that includes a city for which the user is not responsible, the system will set the rate requested for the portion of the area for which the user is responsible and provide a notification to the user that the rate has not been set for the area outside of the user's control.

The system preferably stores a list of all authorized users and tracks the degree of authorization provided to the user. For example, some users may only be given authorization to view information on the system while others are authorized to edit information in the system. In this regard, the rate and distribution system ensures that only authorized users are given access to the system and then, only to the extent authorized.

Administrative Features

Figure 6:
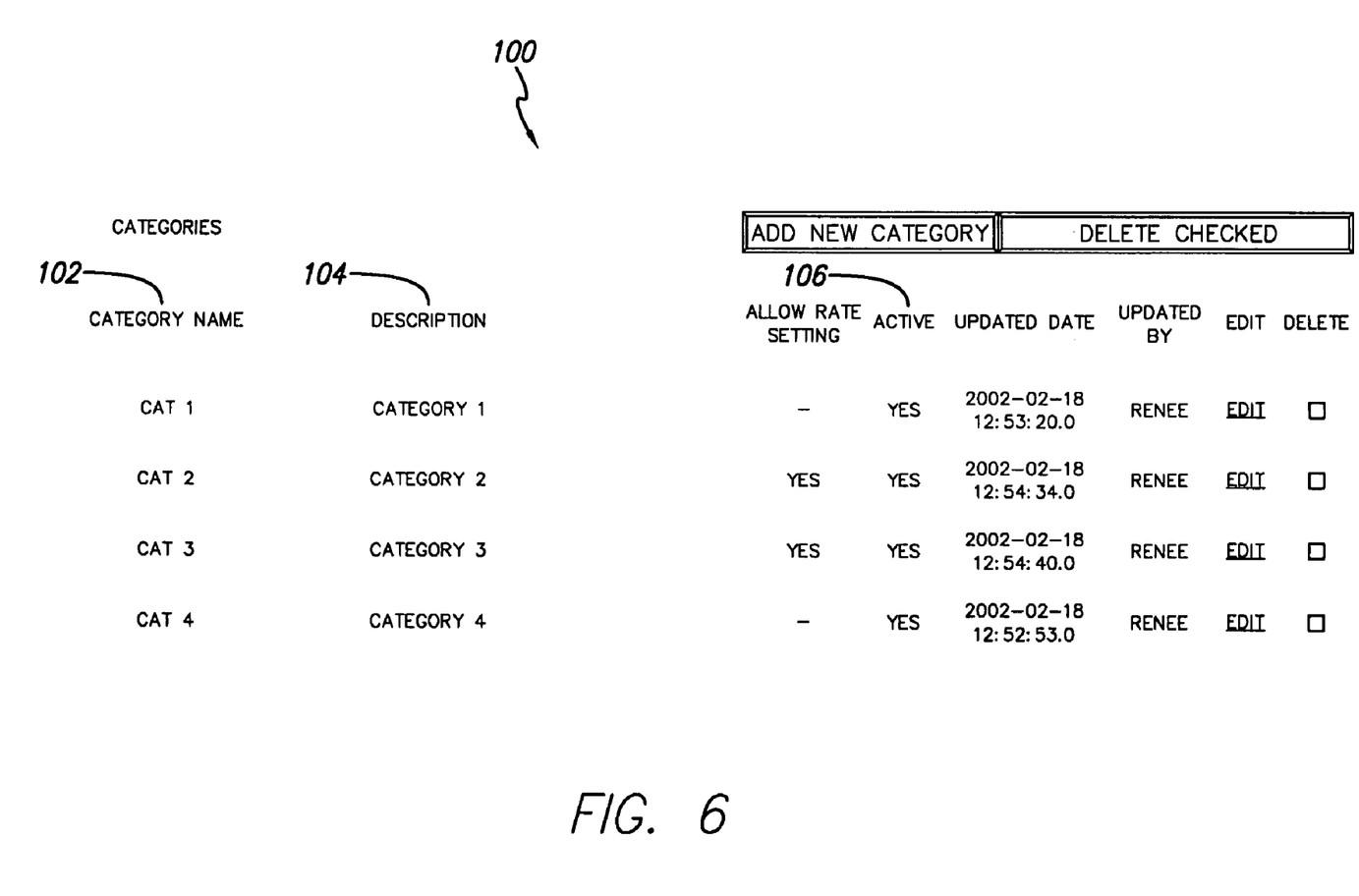
FIG. 6 depicts a preferred embodiment of the product category information feature of the present invention.

In a preferred embodiment of the invention, as shown in FIG. 6, the rate and distribution system includes a categories information feature 100 describing the product categories that are identified in the system. The categories information feature 100 lists the category names 102 available for selection by the users, a description 104 of the product included within each specified category, and the status 106 of the category. For example, as shown in FIG. 6, the category "CAT1" refers to "Category 1" and the status is indicated as being "active."

Figure 7:
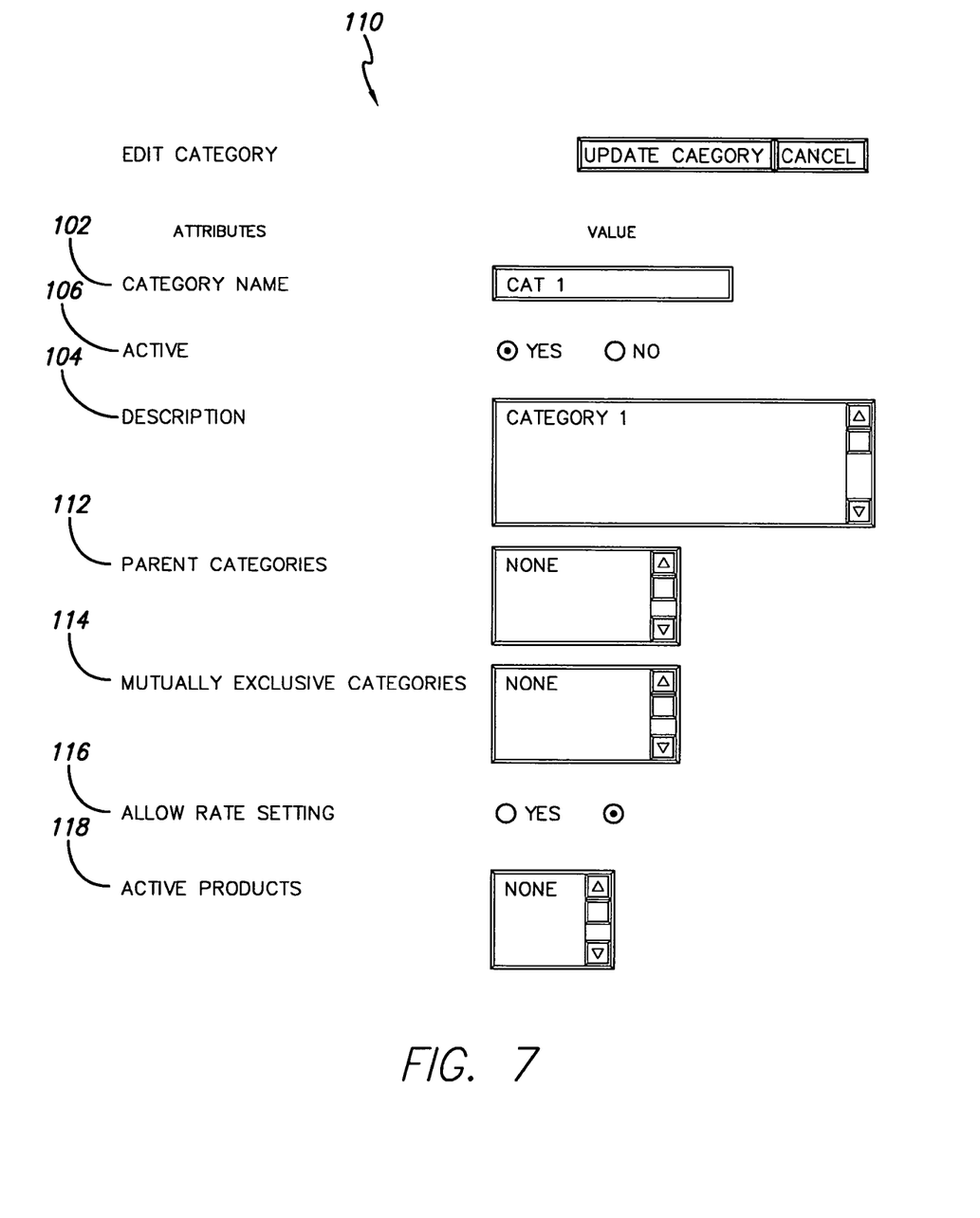
FIG. 7 depicts a preferred embodiment of the edit category feature of the present invention.

The categories information feature 100 can preferably be edited only by an authorized administrator. FIG. 7 depicts the edit category feature 110 of the present invention. In a preferred embodiment of the invention, the edit category feature 110 identifies the category name 102, status 106, description 104, parent categories 112, and mutually exclusive categories 114, all of which can be edited by the administrator. Furthermore, the rate setting key 116 allows the administrator to determine whether the rate setting feature will be enabled for the specified category. Also, the active models box 118 enables the administrator to select the active models that will included in a specified category.

Figure 8:
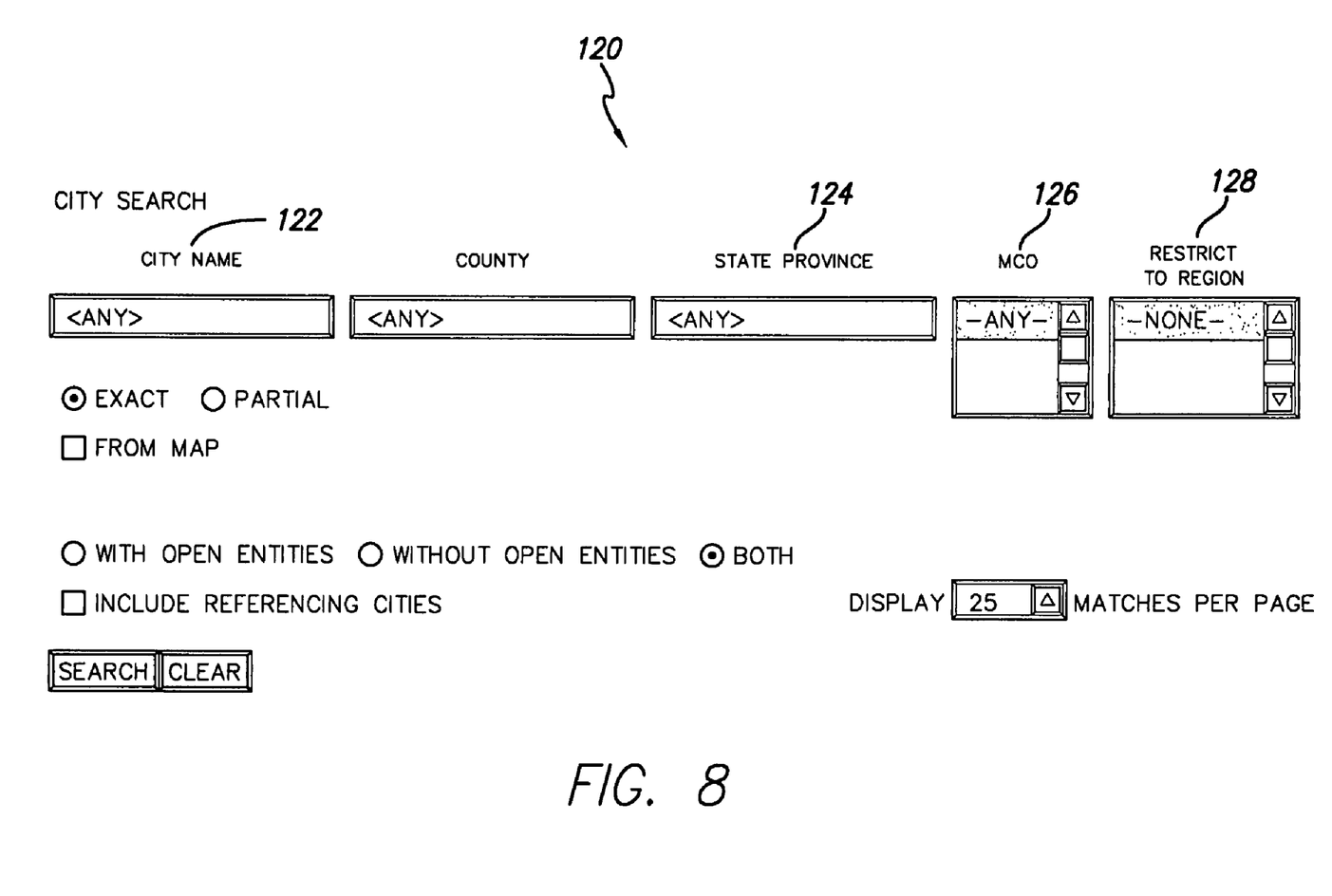
FIG. 8 depicts a preferred embodiment of the city search feature of the present invention.
Figure 9:
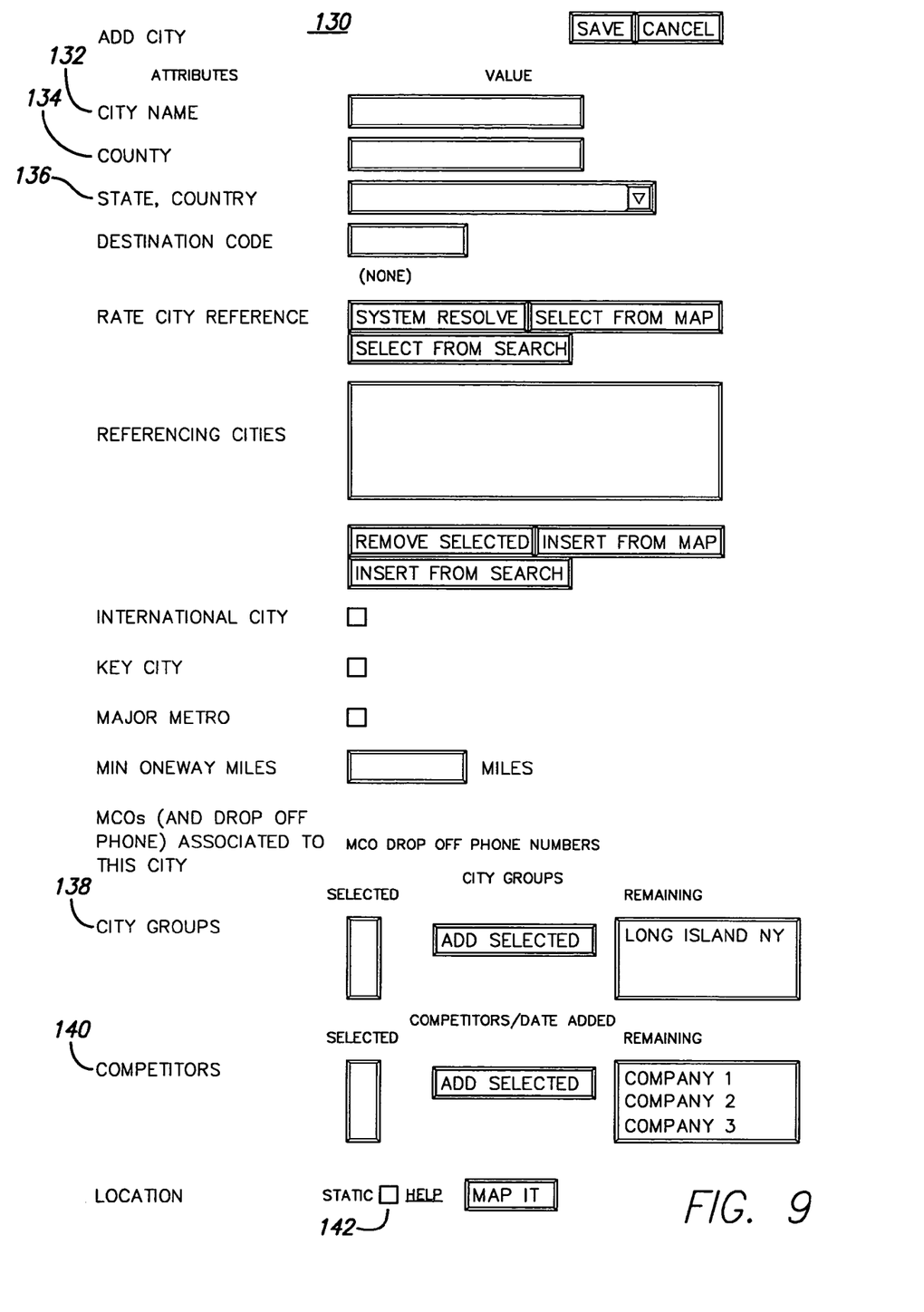
FIG. 9 depicts a preferred embodiment of the add city feature of the present invention.

In a preferred embodiment of the invention, the rate and distribution system includes a cities feature, shown in FIGS. 8 and 9. Generally, a city's boundaries are defined by a municipality, the post office or other such governmental entity. The cities feature of the present invention enables an administrator to redefine a city to include neighboring areas, for the purpose of setting rates. FIG. 8 depicts a preferred embodiment of the city search feature 120 of the present invention. The city search feature 120 enables the administrator to search for a particular city. The administrator is prompted for the city name 122, state or province 124, marketing company 126 or region 128. The administrator should provide the available information and initiate a search. Furthermore, the administrator can elect to find cities with open locations, without open locations, or both. The city search feature 120 will performs the search and provides a list of all cities that match the specified criteria.

FIG. 9 depicts a preferred embodiment of the add city feature 130 of the present invention. The add city feature 130 enables the administrator to define a new city or edit an existing city to include neighboring areas, as desired. To add or edit a city, the administrator is prompted for the city name 132 and/or county 134, and the state and/or country 136. The system preferably geocodes based on the information provided and assigns the appropriate coordinates to return the city requested to the map. The administrator has the option of making the mapped location static 142 so that the inherent growth of a city will not cause the system to adjust the city coordinates. The user is also able to group cities together and identify the hub as a city group 138. If there is competition for business in the new area, the competitors 140 can be identified and stored in the system.

Figure 10:
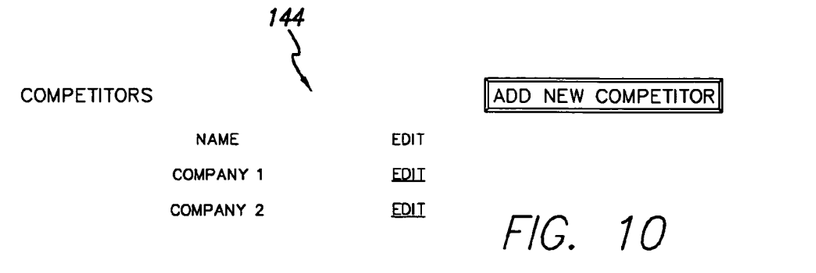
FIG. 10 depicts a preferred embodiment of the competitor intelligence feature of the present invention.
Figure 11:
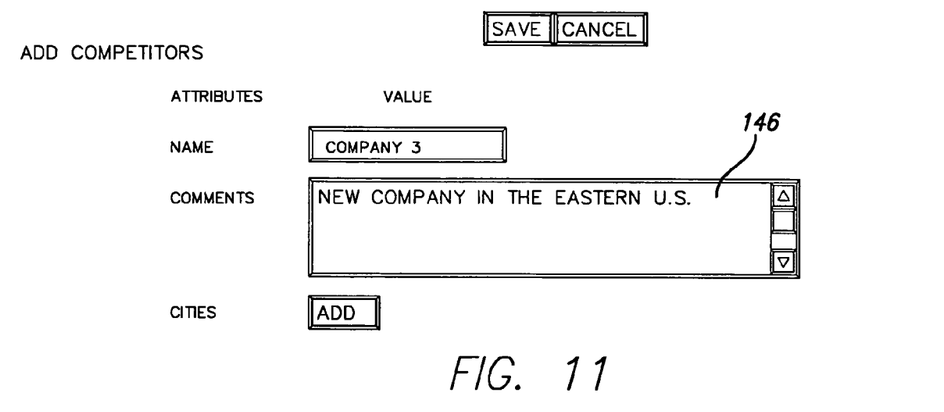
FIG. 11 depicts a preferred embodiment of the edit competitor intelligence feature of the present invention.

The rate and distribution system preferably enables the administrator to store and retrieve intelligence on competitors. As shown in FIGS. 10 and 11, the competitors feature 144 of the invention identifies the business competitors. Information regarding the competitors 146 can also be stored and retrieved.

Figure 13:
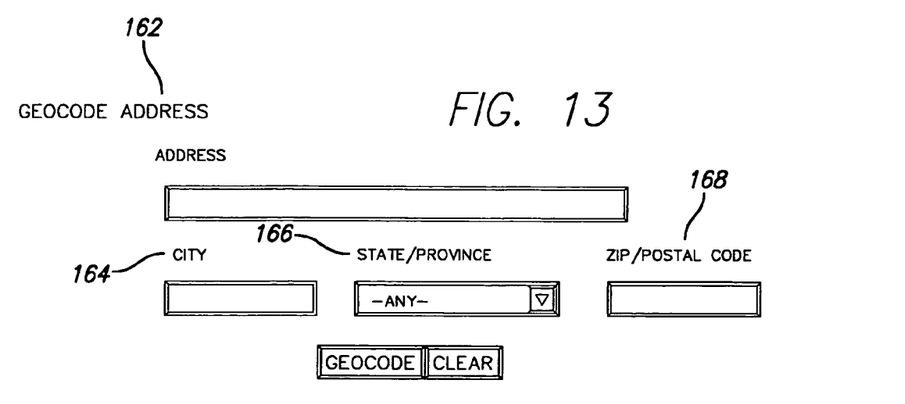
FIG. 13 depicts a preferred embodiment of the geocode feature of the present invention.

When new locations are opened, the rate and distribution system geocodes the new location and identifies it on a map. As shown in FIG. 13, the geocoding feature 160 of the invention enables the administrator to enter the address 162, city 164, state 166 and zip code 168 of a new location. The system preferably validates the address to ensure that the address provided is found in the city and state specified. Furthermore, the system will validate that the correct zip code corresponding to the city and state identified has been assigned. Upon geocoding the new address, the system will assign lattitude and longitude coordinates to the new location and identifies the position of the new location on a map.

The graphical interfaces and mapping tools of the rate and distribution system are preferably interactive. If the location is assigned to an incorrect position on the map, the system preferably allows the administrator to correct the mapped location manually. Accordingly, the maps used in the rate and distribution system are not only viewable but are interactive. In a preferred embodiment of the invention, the position of the new location can be changed by simply clicking and dragging it on a map. By geocoding the locations and storing the lattitude and longitude of each location, the rate and distribution system of the present invention can provide the exact geographic address and directions to each location.

In addition to geocoding and mapping each location, the rate and distribution system preferably geocodes all internally used company boundaries and regions. By defining these areas and mapping them, the rate and distribution system ensures that these areas can be used for analysis or other business purposes.

The rate and distribution system of the present invention is preferably available to users on a network. The network has at least one computer-server for communicating with users. Communication with the users is preferably carried out using a browser program on a computer-terminal at a location remote from the computer-server.

In a preferred embodiment of the invention, the rate and distribution system is in data communication with a data warehouse for receiving information utilized in setting rates, as described above. Furthermore, the rate and distribution system is preferably in data communication with an entity database that provides the system with information pertaining to existing entities and alerts the system regarding the creation of new entities. After the rates are set, the system preferably communicates the rates via a browser to the rental locations. Furthermore, the rates are preferably provided to a website accessible by the public.

The embodiments described above are exemplary embodiments of a rate and distribution system. Those skilled in the art may now make numerous uses of, and departures from, the above-described embodiments without departing from the inventive concepts disclosed herein. Accordingly, the present invention is to be defined solely by the scope of the following claims.

What is claimed is:

1. A method for setting rental rates, comprising the steps of:
providing an interactive graphical mapping interface comprising a computer configured to display a geographic and interactive map, whereby an administrator defines a region having an area of origin and a destination area on the geographic and interactive map by interactively using a selection tool on the graphical mapping interface;
after defining the region on the geographic and interactive map of the graphical mapping interface using the selection tool and the computer, the administrator interactively uses the selection tool on the graphical mapping interface and sets a rental rate;
setting the rental rate for one or more pieces of equipment for the region defined by using at least one of a neighborhood, a city, a state, a geographical region, a current rate, and a rate history to determine the rental rate; and
saving the region defined and the rental rate set corresponding to the region defined.

2. The method of claim 1 wherein the rental rate is set for a future effective date.

3. The method of claim 1 comprising the step of identifying an equipment category for which the rental rate is set.

4. The method of claim 1 wherein the region is geographically non-continuous.

5. The method of claim 1 wherein the graphical mapping interface is touch-based and the region is defined by selecting the region on the graphical mapping interface.

6. The method of claim 5 wherein the region is defined by selecting a radius about a reference city.

7. The method of claim 5 wherein the region is defined by drawing a non-circular boundary about a reference city.

8. A method for setting rates, comprising the steps of:
providing a graphical mapping interface comprising a computer configured to display a geographic and interactive map, whereby an administrator defines a region having a first region and a second region on the geographic and interactive map by interactively using a selection tool on the graphical mapping interface;
defining the first region on the geographic and interactive map of the graphical mapping interface using the selection tool and the computer and designating the first region as a region of origin;
defining the second region on the geographic and interactive map of the graphical mapping interface using the selection tool and the computer and designating the second region as a destination region;
interactively using the selection tool on the graphical mapping interface and setting a rental rate for one or more pieces of equipment for a route originating in the region of origin and terminating in the destination region by using at least one of a neighborhood, a city, a state, a geographical region, a current rate, and a rate history to determine the rental rate; and
saving the first region and the second region defined and the rental rate set corresponding to the first region and the second region defined.

9. The method of claim 8 wherein the rental rate is set for a future effective date.

10. The method of claim 8 comprising the further step of defining an equipment category for which the rate is set.

11. The method of claim 8 wherein at least one of the region of origin and the destination region is geographically non-continuous.

12. The method of claim 8 wherein the graphical mapping interface is touch-based and at least one of the region of origin and the destination region is defined by selecting the region on the graphical mapping interface.

13. The method of claim 12 wherein at least one of the region of origin and the destination region is defined by selecting a radius about a reference city.

14. The method of claim 12 wherein at least one of the region of origin and the destination region is defined by drawing a non-circular boundary about a reference city.

15. A rate system comprising:
a network having a computer-server and a terminal in data communication with the computer-server;
a browser-based system accessible to users via the terminal, wherein the browser-based system is configured to:
a) display an interactive graphical mapping interface comprising the computer-server and the terminal configured to display a geographic and interactive map, whereby an administrator defines a region having an area of origin and a destination area on the geographic and interactive map by interactively using a selection tool on the graphical mapping interface;
b) enable the administrator to define the region using the geographic and interactive map of the graphical mapping interface using the selection tool, the computer-server, and the terminal interactively1 whereby the administrator interactively uses the selection tool on the graphical mapping interface and sets an equipment rental rate;
c) enable the administrator to set the equipment rental rate for one or more pieces of equipment for the region by using at least one of a neighborhood, a city, a state, a geographical region, a current rate, and a rate history to determine the equipment rental rate; and
d) enable the administrator to save the region and the equipment rental rate corresponding to the region.

16. The rate system of claim 15 wherein the browser-based system is further configured to display market information regarding the defined region.

17. A rate system for facilitating rate selection for a business having a plurality of entities, the rate system comprising:
a network having a computer-server and a terminal in data communication with the computer-server;
a browser-based system accessible to users via the terminal, wherein the browser-based system is configured to:
a) display a graphical mapping interface comprising the computer-server and the terminal configured to display a geographic and interactive map, the graphical mapping interface depicting the geographic location of the entities of the equipment rental business, and whereby an administrator defines a region having an area of origin and a destination area on the geographic and interactive map by interactively using a selection tool on the graphical mapping interface;
b) enable the administrator to define the region using the geographic and interactive map of the graphical mapping interface interactively, whereby the administrator interactively uses the selection tool on the graphical mapping interface and sets an equipment rental rate, the region including at least one entity, wherein the region is capable of including non-neighboring entities;
c) enable the administrator to set the equipment rental rate for one or more pieces of equipment for the region by using at least one of a neighborhood, a city, a state, a geographical region, a current rate, and a rate history to determine the equipment rental rate; and
d) enable the administrator to save the region and the equipment rental rate corresponding to the region.

18. The rate system of claim 17 wherein the graphical mapping interface comprises a touchscreen.

19. The rate system of claim 18 wherein the user manipulates a view on the touchscreen using a selection tool to define the region.

20. The rate system of claim 17 comprising an edit city feature configured to enable users to redefine city boundaries.

21. A method for setting rates for a plurality of entities, comprising the steps of:
providing an interactive graphical mapping interface comprising a computer configured to display a geographic and interactive map comprising the geographical location of the plurality of entities, whereby an administrator defines a region having an area of origin and a destination area on the geographic and interactive map by interactively using a selection tool on the graphical mapping interface;
after defining the region on the geographic and interactive map of the graphical mapping interface using the selection tool and the computer, the administrator interactively uses the selection tool on the graphical mapping interface and sets an equipment rental rate, wherein the region comprises the geographical location of at least one of the plurality of entities;
using the computer, importing the at least one of the plurality of entities into a working set index;
using the computer, refining the region by editing the entities in the working set index;
setting the equipment rental rate for one or more pieces of equipment for the region defined by using at least one of a neighborhood, a city, a state, a geographical region, a current rate, and a rate history to determine the equipment rental rate; and saving the region defined and the equipment rental rate set corresponding to the region defined.

22. A rate system comprising:

a network having a computer-server and a terminal in data communication with the computer-server;

a browser-based system accessible to users via the terminal, wherein the browser-based system comprises:

a) means for displaying an interactive graphical mapping interface comprising the computer-server and the terminal configured to display a geographic and interactive map, whereby an administrator defines a region having an area of origin and a destination area on the geographic and interactive map by interactively using a selection tool on the graphical mapping interface;

b) means for defining the region using the geographic and interactive map of the graphical mapping interface using the selection tool, the computer-server, and the terminal, whereby the administrator interactively uses the selection tool on the graphical mapping interface and sets an equipment rental rate;

c) means for setting the equipment rental rate for one or more pieces of equipment for the region by using at least one of a neighborhood, a city, a state, a geographical region, a current rate, and a rate history to determine the equipment rental rate; and saving the region defined and the equipment rental rate set corresponding to the region defined.

23. The rate system of claim 22 wherein the interactive graphical mapping interface comprises a rate setting input interface.

24. The rate system of claim 22 wherein the graphical mapping interface comprises an rate effective date input interface.

25. A rate system comprising:

a network having a computer-server and a terminal in data communication with the computer-server;

a browser-based system accessible to users via the terminal, wherein the browser-based system comprises:

a) means for displaying an interactive graphical mapping interface comprising the computer-server and the terminal configured to display a geographic and interactive map, whereby an administrator defines a region on the geographic and interactive map by interactively using a selection tool on the graphical mapping interface;

b) means for defining the region using the a hic and interactive map of the graphical mapping interface using the selection tool, the computer-server, and the terminal, whereby the administrator interactively uses the selection tool on the graphical mapping interface and sets a rental rate;

c) designating the region one of a region of origin or a destination region;

d) means for setting the rental rate for one or more pieces of equipment for one of the region of origin, the destination region and a route from the region of origin to the destination region by using at least one of a neighborhood, a city, a state, a geographical region, a current rate, and a rate history to determine the rental rate; and e) saving the region defined and the rental rate set corresponding to the region defined.

26. A method for setting rental rates, comprising the steps of:

providing an interactive graphical mapping interface comprising a computer configured to display a geographic and interactive map, whereby an administrator defines a region having an area of origin and a destination area on the geographic and interactive map by interactively using a selection tool on the graphical mapping interface;

defining the region on the geographic and interactive map of the graphical mapping interface using the selection tool and the computer, whereby the administrator interactively uses the selection tool on the graphical mapping interface and sets an equipment rental rate;

using the graphical mapping interface, displaying market information for the region defined;

setting the equipment rental rate for one or more pieces of equipment for the region defined by using at least one of a neighborhood, a city, a state, a geographical region, a current rate, and a rate history to determine the equipment rental rate; and saving the region defined and the equipment rental rate set corresponding to the region defined.

* * * * *